(12) United States Patent
Nelson et al.

(10) Patent No.: US 6,681,552 B2
(45) Date of Patent: Jan. 27, 2004

(54) BALER ROTOR REVERSER

(75) Inventors: Bradley D. Nelson, Pella, IA (US); William A. Hood, Pella, IA (US); Ryan G. Walker, Newton, IA (US)

(73) Assignee: Vermeer Manufacturing Company, Pella, IA (US)

( * ) Notice: Subject to any disclaimer, the term of this patent is extended or adjusted under 35 U.S.C. 154(b) by 25 days.

(21) Appl. No.: 09/776,531

(22) Filed: Feb. 2, 2001

(65) Prior Publication Data

US 2002/0104303 A1 Aug. 8, 2002

(51) Int. Cl.$^7$ .................... A01D 69/08; A01D 39/00
(52) U.S. Cl. ................... 56/11.2; 56/10.2; 56/341
(58) Field of Search .................... 56/10.3, 10.8, 56/11.2, 11.3, 341, 343, DIG. 6, 10.2 R (56) References Cited

U.S. PATENT DOCUMENTS

| | | | |
|---|---|---|---|
| 4,261,161 A | * | 4/1981 | Colgrove et al. ............ 460/3 |
| 4,512,139 A | * | 4/1985 | Musser et al. ............ 56/11.2 |
| 4,663,919 A | * | 5/1987 | Stroh et al. ............ 56/11.2 |
| RE32,599 E | * | 2/1988 | Musser et al. ............ 56/11.2 |
| 5,462,486 A | * | 10/1995 | Norton ............ 460/20 |
| 5,527,218 A | * | 6/1996 | Van den Bossche et al. .... 460/116 |
| 5,752,374 A | * | 5/1998 | Allworden et al. ............ 56/341 |
| 5,778,644 A | * | 7/1998 | Keller et al. ............ 56/11.2 |
| 5,894,718 A | | 4/1999 | Hawlas et al. |
| 5,996,324 A | * | 12/1999 | Oligmueller ............ 56/11.2 |
| 6,105,353 A | | 8/2000 | Mohr et al. |
| 6,161,368 A | * | 12/2000 | Wilkens et al. ............ 56/341 |
| 6,298,646 B1 | * | 10/2001 | Schrag et al. ............ 100/88 |
| 6,318,056 B1 | * | 11/2001 | Rauch et al. ............ 56/10.3 |

FOREIGN PATENT DOCUMENTS

| | | |
|---|---|---|
| DE | 3506461 | 8/1986 |
| DE | 19534138 C1 | * 10/1998 |
| EP | 0339734 | 11/1989 |
| FR | 2708828 | 2/1995 |
| GB | 857810 | 1/1961 |
| GB | 2169366 | 7/1986 |

OTHER PUBLICATIONS 3 pages—color—first page entitled CLAAS—Round Balers—Rollant 250—250 Roto Feed—250 RC—250 RC Comfort—by CLAAS of America, Inc.—no date.
4 pages—color photos—showing a CLAAS brand baler with manual reversing—no date.

* cited by examiner

Primary Examiner—Robert E. Pezzuto
Assistant Examiner—Nathan Mammen
(74) Attorney, Agent, or Firm—Sturm & Fix LLP (57) ABSTRACT

A reverser which, in a preferred embodiment, has a hydraulic cylinder supported by a chopper baler frame. The opposite end of the hydraulic cylinder is attached to the reverser driver. When activated by hydraulics on a tractor, the hydraulics will extend the cylinder, causing the sprockets to be disengaged. Further extension of the cylinder will cause the reverser driver to engage the reverser sprocket and turn the rotor backwards slightly. After full extension, the cylinder will then be retracted. This process can be repeated a couple of times in order to remove the blockage. The reverser enables the operator to restore the baler to its working condition from the tractor seat. Being able to disengage the rotor from the rest of the machine enables the bale to be wrapped if a major blockage occurs. Also a controlled reversing motion is beneficial, so over-reversing does not occur.

18 Claims, 6 Drawing Sheets

OPERATING POSITION

DISENGAGING POSITION

REVERSING POSITION

BALER ROTOR REVERSER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to a baler and more particularly to one which has a rotor for assisting the chopping of the crop before it enters a baling chamber and which allows the rotor to be reversed when the baler becomes plugged.

2. Description of the Related Art

In a chopper baler, there is a pickup reel which picks a windrow of crop up from the ground and transfers it to a rotor which forces the crop through knives which can be selectively engaged to cut the crop. This rotor effectively transfers the crop from the pickup reel to a baling chamber where the crop is turned into a bale. In the preferred embodiment, this baler is one for making large round bales, but this invention is not limited to a round baler.

From time to time, such a large amount of crop is moved from the reel to the rotor area that the crop is unable to pass through the throat of the machine. The rotor will then abruptly stop turning. This is termed a "blockage". Traditionally, the blockage is removed by hand or by use of a lever to manually turn the machine backwards to remove the blockage. Sometimes a powered shaft is used to turn the baler backwards. To some extent this is similar to combines which use electric starter motors or planetary drives that allow reversal of blockages.

The prior art of removing blockages by hand or with a lever or even with a powered shaft is time consuming and difficult. Consequently, there is a need for a device to more easily facilitate removing the blockage from a baler.

BRIEF SUMMARY OF THE INVENTION

The present invention relates to a reverser, which in a preferred embodiment has a hydraulic cylinder supported by a chopper baler frame. The opposite end of the hydraulic cylinder is attached to the reverser driver. When activated by hydraulics on a tractor, the hydraulics will extend the cylinder, causing the sprockets to be disengaged. Further extension of the cylinder will cause the reverser driver to engage the reverser sprocket and turn the rotor backwards slightly. After full extension, the cylinder will then be retracted. This process can be repeated a couple of times in order to remove the blockage.

The reverser enables the operator to restore the baler to its working condition from the tractor seat. Being able to disengage the rotor from the rest of the machine enables the bale to be wrapped if a major blockage occurs. Also a controlled reversing motion is beneficial, so over-reversing does not occur.

An object of the present invention is to provide an apparatus for allowing an operator to free the blockage of crop in a chopper baler from the tractor seat.

Another object of the present invention is to have a reverser which also disengages the rotor from the rest of the baler, to allow the bale to be wrapped in the event of a severe blockage.

A still further object of the present invention is to provide a reverser which reverses the rotor in incremental steps, thereby reducing the risk of damage to the machine.

Other objects, advantages and novel features of the present invention will become apparent from the following detailed description of the invention when considered in conjunction with the accompanying drawings.

DETAILED DESCRIPTION OF THE INVENTION

Figure 1:
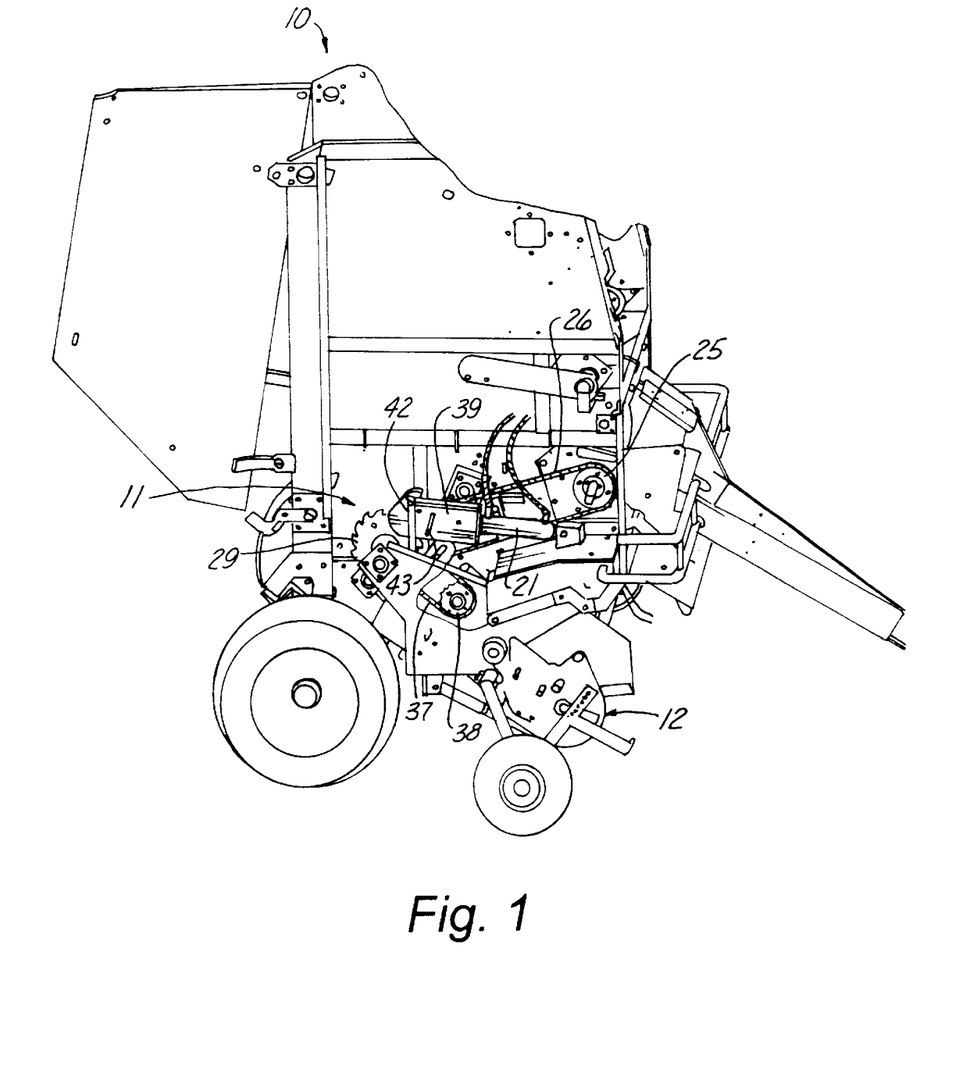
FIG. 1 is a side elevational view of a chopper baler incorporating the preferred embodiment of the present invention thereto.
Figure 2:
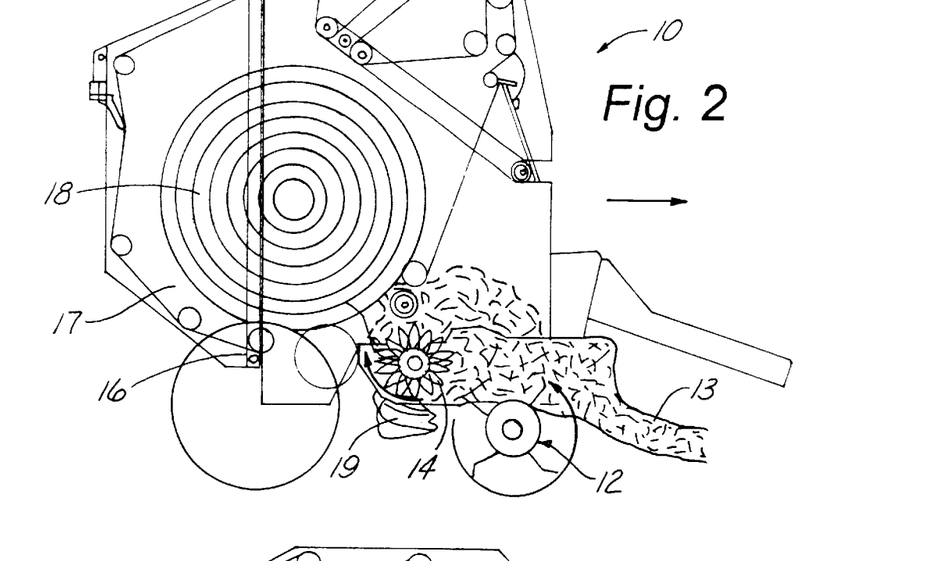
FIG. 2 is a cross sectional simplified view showing a bale being formed in a bale chamber, a pickup rotating to pull a windrow of crop to a rotor which rotates to move the crop to the baling chamber.

Referring now to the drawings, wherein like reference numerals designate identical or corresponding parts throughout the several views, FIG. 1 shows a baler (10) having a reverser (11) attached thereto. Referring now to FIG. 2, it is noted that a pickup reel (12) normally turns in a counter-clockwise direction as viewed in FIG. 2 to pull the windrow (13) of crop toward a rotor (14). This rotor (14) moves in a clockwise direction in FIG. 2 to pull the crop into a throat portion (16) and ultimately into a baling chamber (17) to form a bale (18). This rotor (14) has knives (19) which can extend into and between the fingers of the rotor (14) and, when extended, will cut the crop (13) as it is passed the blades (19) by rotor (14). These knives (19) can also be disengaged by being moved downwardly in the position shown in FIG. 2, for example as shown in U.S. patent application Ser. No. 09/498,527, filed Feb. 4, 2000, now abandoned.

Figure 4:
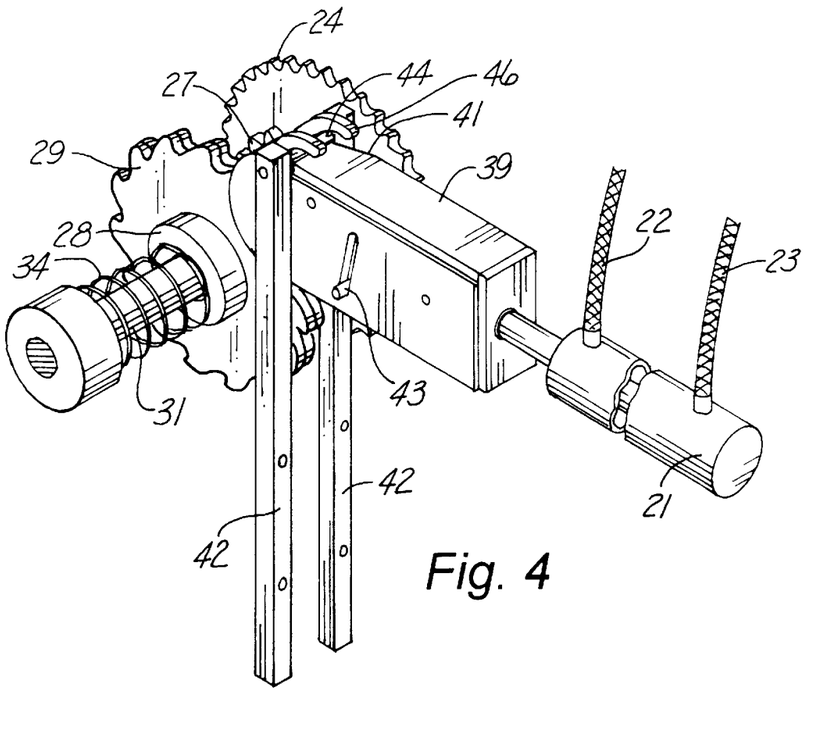
FIG. 4 is an enlarged perspective view of a preferred embodiment of the present invention.

Referring now to FIGS. 1 and 4, it is noted that a hydraulic cylinder (21) has hoses (22) and (23) associated therewith for extending or retracting the hydraulic cylinder (21).

Figure 5:
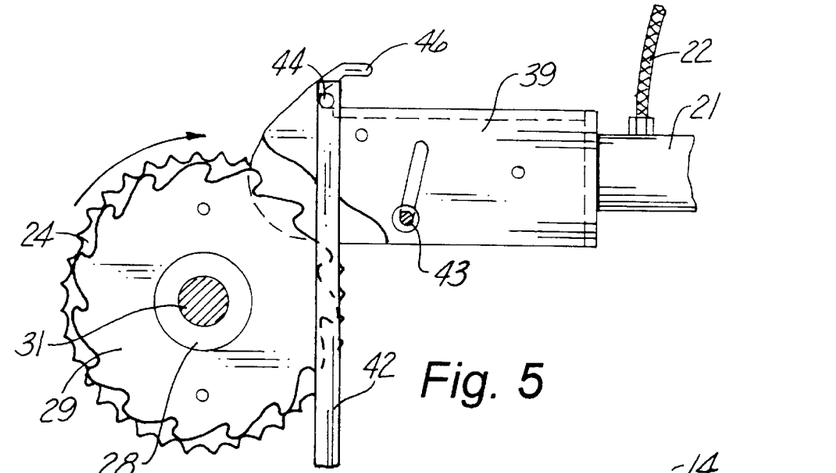
FIG. 5 is a cross sectional view showing the present invention in a normal operating position where a bale is being formed.
Figure 5A:
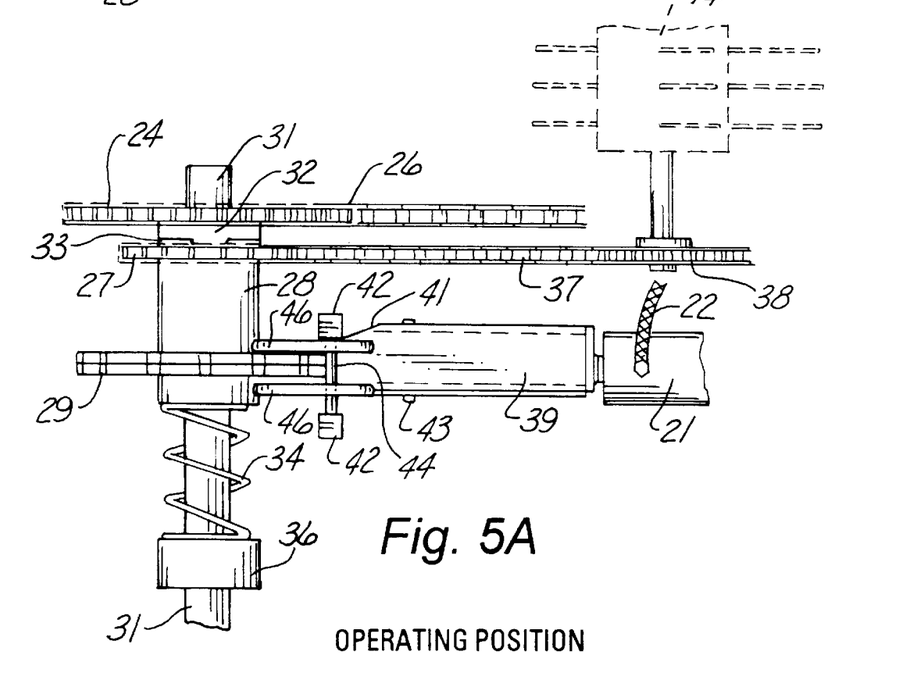
FIG. 5A is a top view of the present invention shown while a bale is being formed and is powered by the primary power to the baler.

Referring now to FIG. 5A, it is noted that a driver sprocket (24) has a chain (26) extending therearound and this chain (26) is ultimately coupled to a primary source of power which is sprocket (25) which is ultimately driven by the power-takeoff of a tractor (not shown). A reverser driven sprocket (27) is rigidly connected to a hub (28). A reverser gear (29) is also rigidly attached to the hub (28) so that in the position shown in FIG. 5A, the hub (28) rotates with the driver sprocket (24) which is rigidly attached to the shaft (31).

A projection (32) rigidly attached to the driver sprocket (24) extends into a notch (33) in hub (28) so that when the driver sprocket (24) turns, so does the hub (28) and reverser driven sprocket (27) and reverser gear (29). The hub (28) is held such that the notch (33) and projection (32) are engaged because a spring (34) is pushing the hub (28) toward the driver sprocket (24). A sleeve (36) is rigidly attached to the shaft (31) and holds the spring (34) in place and permits the hub (28) to move from the position shown in FIG. 5A to the position shown in FIG. 6A, which will be described below.

Figure 3:
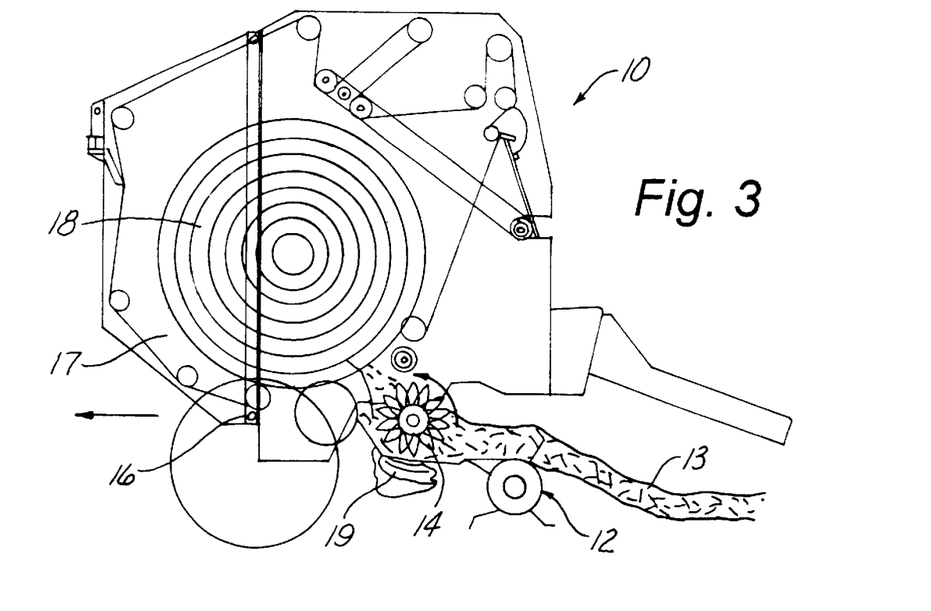
FIG. 3 is a view like FIG. 2, but showing the rotor reversing to pull crop from the throat of a baler which is plugged.
Figures 6, 6A:
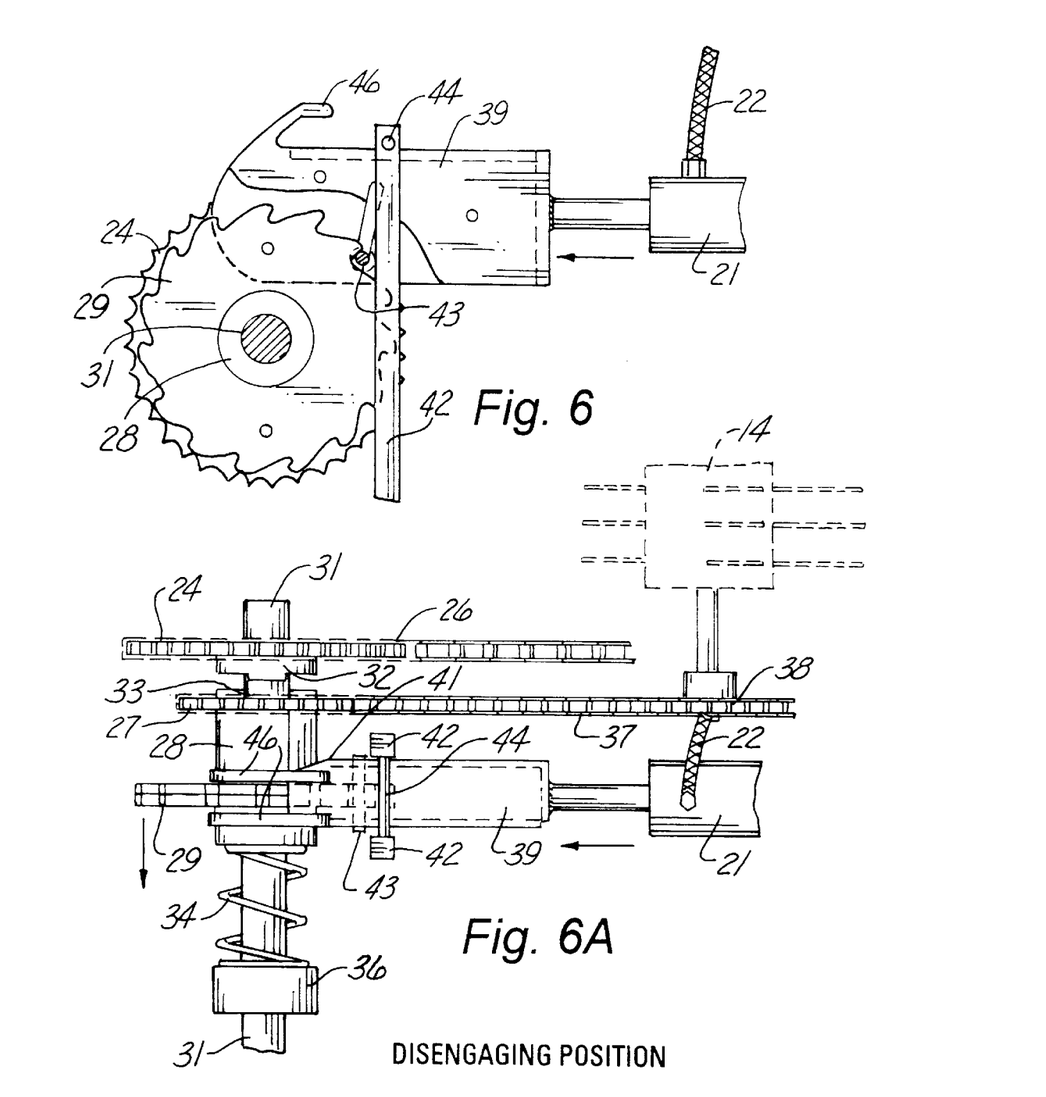
FIG. 6 is a view like FIG. 5 but showing a spreader moved by a hydraulic cylinder to disengage the drive sprocket of the reverser from the primary driven sprocket so that a bale can be formed on the one hand and on the other hand set up a condition where the rotor can be reversed.
FIG. 6A is a top view of the present invention as described above in FIG. 6.

When the baler (10) is normally being used to bale the crop, such as shown in FIG. 2, the rotor (14) is moved in the direction shown in FIG. 2 by a chain (37) which engages the reverser driven sprocket (27) and engages a reverser sprocket (38). Consequently, the rotor (14) moves in whatever direction the rotor sprocket (38) turns. A reverser drive frame (39) is preferably integral with a camming surface (41) which will be referred to as a spreader (41). The drive frame (39) and camming surface (41) can be separate, however, if desired. This spreader (41) and reverser driver frame (39) are sized to fit through the slot of a rigid post (42). So, as shown in FIG. 5A, when the cylinder (21) is retracted, the spring (34) will push the hub (28) to engage and rotate with the driver sprocket (24). When the baler stops because of a blockage, the hydraulic cylinder (21) is extended to the position shown in FIGS. 6 and 6A which is the disengaging position. When this occurs, it will be appreciated that the spreader (41) has cammed against the top rigid post (42) as shown in FIG. 6A and this moves the hub (28) and everything connected to it away from the driver sprocket (24) so that the projection (32) no longer extends into notch (33). At this time, the primary power can be used to finish wrapping and putting twine or another covering on the bale (18) as shown in FIG. 3.

Figure 7:
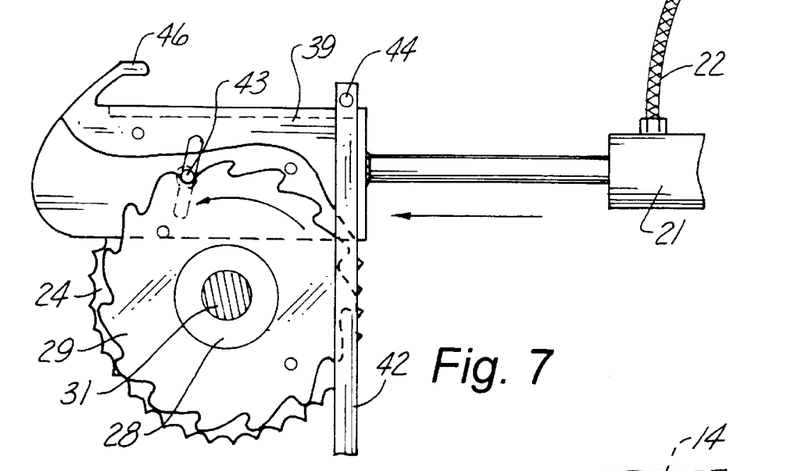
FIG. 7 shows a view showing the present device in a reversing position by extending the hydraulic cylinder even more than is shown in FIG. 6.
Figure 7A:
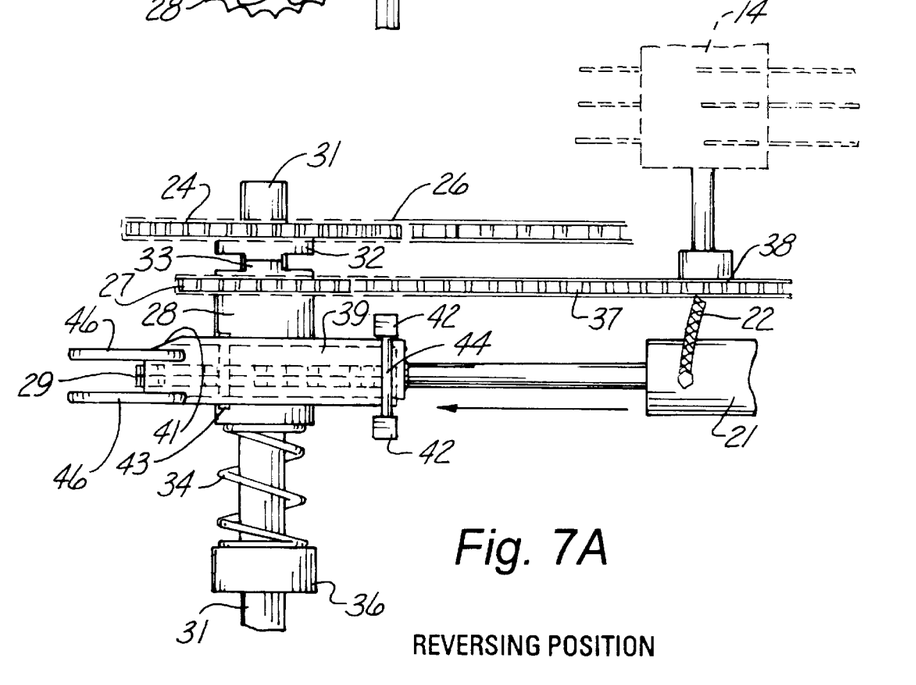
FIG. 7A is a top view of the present invention as shown in FIG. 7 and showing that the reverser is still disengaged from the primary power and also shows how it has been reversed by having a pin rotate a reverser gear, which thereby reverses the rotation of the rotor.

At this time, the hydraulic cylinder (21) can be extended further from the position shown in FIGS. 6 and 6A to the position shown in FIGS. 7 and 7A. What this does is reverse the rotation of the rotor (14) to the counter-clockwise direction shown in FIG. 3 to pull the blockage out of the throat of the baler. This is done by having the driver frame push a pin (43) which is biased downwardly to the position shown in FIG. 4 which will engage the teeth of reverser gear (29) and rotate the reverser gear (29) from the position shown in FIG. 6 to the position shown in FIG. 7. When this occurs, because the reverser gear (29) and the reverser driven sprocket (27) are both rigidly attached to the hub (28), turning of the reverser gear (29) will cause a like reversing of the reverser driven sprocket (27). Then, because of the chain (27), it will also reverse the rotor sprocket (38), thereby reversing the rotor (14). This procedure can be repeated one or two more times, for example by moving the hydraulic cylinder back to the position shown in FIG. 6, and then after that, back to the position shown in FIG. 7. This will make a partial turn of the rotor and will unblock the throat (16). Then the baler (10) will be in a condition to return to the normal baling operation. It is noted that in the preferred embodiment, the pickup reel (12) does not rotate when the reverser is in operation as shown in FIGS. 3, 6 and 7.

In order to resume the normal baling operation as shown in FIG. 2, of course without the blockage therein, the hydraulic cylinder (21) is shortened to the position shown in FIGS. 5 and 5A. This will again allow the primary power to reverser-driven sprocket (24) to turn the hub (28) and thereby turn the reverser-driven sprocket (27). This will turn the rotor sprocket (38) through reverser chain (37), again in the clockwise direction as shown in FIG. 2, to pull the windrow of crop (13) from the pickup reel (12) through the throat (16) and into the baling chamber (17) to form a bale (18).

In operation, when an operator becomes aware that the baler is plugged, the operator will disengage the power to the power take-off (PTO). At this time the operator activates the tractor's hydraulic system to provide pressure to the hydraulic cylinder (21). The reverser extends, causing the reverser spreader (41) to contact the rigid post (42). This motion, in turn, causes the reverser gear (29), reverser hub (28) and reverser-driven sprocket (27) to translate outward along the jack shaft (31). This disengages the coupling with the reverser driver sprocket (24).

At this time the rotor drive is disengaged from primary power. The operator can then turn on the PTO and continue to prepare the bale for ejection by wrapping it with twine or net wrap. The re-engagement of the PTO at this time can also aid in the removal of blockage by pulling material from the backside of the rotor (14) and onto the bale. After this has been completed, the operator will disengage the PTO. The complete extension of the hydraulic cylinder will cause the reverser drive bolt (43) to contact the reverser gear (29) and force it to rotate counter-clockwise. This motion also requires the reverser chain (37) and rotor sprocket (38) to rotate counter-clockwise, enabling the rotor (14) to turn backwards, which will drag the blockage to the front of the machine in small increments. It is believed that three or four extension and retraction cycles are typically necessary to remove the blockage completely.

The operator will now completely retract the reverser cylinder so that it pulls itself onto the carrier rod (44) by its carrier hooks (46). The spring (34) then pushes the reverser gear (29), hub (28) and driven sprocket (27) back into the normal baling position. The operator is now able to engage the PTO. The blockage will now be pulled into the baler and the operator can continue baling.

Accordingly, it will be appreciated that the preferred embodiment does indeed accomplish the aforementioned objects. A reverser for the rotor (14) could utilize a reversible gear box, a DC starter or a hydraulic motor. Therefore means-plus-function clauses are intended to cover the structures described herein as performing the recited function, i.e. not only structural equivalents, but also equivalent structures. Obviously many modifications and variations of the present invention are possible in light of the above teachings. It is therefore to be understood that, within the scope of the appended claims, the invention may be practiced otherwise than as specifically described.

We claim:

1. In a baler of a type having a frame and a rotor operatively rotatably attached to said frame for moving a windrow of crop material into a baling chamber and a rotor sprocket operatively attached to said rotor for turning the rotor in a first rotary direction to move the crop material toward the baling chamber, a shaft disposed for rotation about a first axis, and a driver sprocket operatively connected to said shaft and to a primary source of rotary power for selectively rotating said rotor sprocket and thereby rotating said rotor in the first rotary direction to move crop toward said baling chamber, said driver sprocket being rotatably disposed about the first axis; the improvement comprising:

a hub operatively attached to said frame and being rotatably and slidably operably disposed on said shaft;

a reverser driven sprocket operatively attached to said hub for rotation about the first axis with said hub;

a reverser gear operatively attached to the hub for rotation with the hub about the first axis, said reverser gear having teeth thereon;

a spring for biasing said hub to a first lateral position along said shaft for operably engaging said driver sprocket whereby said hub will rotate with said driver sprocket, thereby causing the reverser driven sprocket and said reverser gear to rotate with said hub;

a spreader having a first, second and third position for selectively moving the hub to a second lateral position when the spreader is in the second position thereof whereby the hub is not in operative engagement with said driver sprocket and whereby the hub can rotate on said shaft about said first axis said hub being engaged for rotary movement with said driver sprocket when said spreader is in the first position thereof;

a driver frame operatively attached to said spreader and also having said first, second and third positions; and a drive bolt on said driver frame for operatively engaging the teeth of said reverser gear when said driver frame moves from the second to the third position thereof for causing the hub, reverser gear and reverser driven sprocket to rotate in a direction opposite to the direction of rotation of said driver sprocket whereby the rotor will be turned in a direction opposite to said first rotary direction to thereby move crop material away from said baling chamber.

2. In a baler of a type having a frame and a rotor operatively rotatably attached to said frame for moving a windrow of crop material into a baling chamber and a rotor sprocket operatively attached to said rotor for turning the rotor in a first rotary direction to move the crop material toward the baling chamber, a shaft disposed for rotation about a first axis, and a driver sprocket operatively connected to said shaft and to a primary source of rotary power for selectively rotating said rotor sprocket and thereby rotating said rotor in the first rotary direction to move crop toward said baling chamber, said driver sprocket being rotatably disposed about the first axis; the improvement comprising:

a hub operatively attached to said frame and being rotatably and slidably operably disposed on said shaft;

a reverser driven sprocket operatively attached to said hub for rotation about the first axis with said hub;

a spring for biasing said hub to a first lateral position along said shaft for operably engaging said driver sprocket whereby said hub will rotate with said reverser driver sprocket, thereby causing the driven sprocket to rotate with said hub;

a spreader having a first and a second position for selectively moving the hub to a second lateral position when the spreader is in the second position thereof whereby the hub is not in operative engagement with said driver sprocket and whereby the hub can rotate on said shaft about said first axis, said hub being engaged for rotary movement with said driver sprocket when said spreader is in the first position thereof; and driver frame means operatively attached to said spreader for selectively causing the hub and reverser driven sprocket to rotate in a direction opposite to the direction of rotation of said driver sprocket at a time when said hub is not in operative engagement with said driver sprocket, whereby the rotor will be turned in a direction opposite to said first rotary direction to thereby move crop material away from said baling chamber.

3. In a baler of a type having a frame, a baling chamber, a power transmission system for transferring power from a prime mover to a drive system, bale forming elements that are powered by the drive system, and a rotor operatively rotatably attached to said frame and powered by the drive system for moving and/or conditioning a windrow of crop material, a method for clearing a plug comprising:

providing overload protection for baler such that power transmission to baler is interrupted upon encountering the plug situation; and providing a selective drive mechanism that enables the rotor to be selectively disengaged from the rest of the drive such that subsequent re-engagement of power transmission system transfers all power to the bale forming elements.

4. The method of claim 3 further comprising providing a rotor reversing mechanism which operates in conjunction with the selective drive mechanism to partially rotate the rotor in a reverse direction upon activation of the selective drive mechanism.

5. A bale forming machine for baling agricultural crops of a type having a frame and a rotor operatively rotatably attached to said frame for moving a windrow of crop material into a baling chamber comprising:

a power train operatively connected to a portion of the bale forming machine that forms a bale in the baling chamber, said power train also being operatively attached to a rotor which moves a crop material toward the baling chamber;

a clutch selectively operatively attached to the power train and the rotor for selectively attaching or detaching said power train to said rotor;

a reversing mechanism operatively attached to said frame for selectively reversing the direction of rotation of said rotor between said first rotary direction and a second rotary direction for causing crop to move away from said baling chamber;

an actuator operatively attached to said clutch and to said reversing mechanism for operating both (a) said clutch to selectively connect or disconnect the rotor from the power train and (b) said reversing mechanism to selectively reverse the rotor without disconnecting the power train from the portion of the bale forming machine that forms a bale in the baling chamber; and wherein said clutch comprises:

a hub operatively attached to said frame and being rotatably and slidably operably disposed on said shaft;

a reverser driven sprocket operatively attached to said hub for rotation about the first axis with said hub;

a spring for biasing said hub to a first lateral position along a shaft for operably engaging a driver sprocket whereby said hub will rotate with said driver sprocket, thereby causing the driven sprocket to rotate with said hub; and a spreader having a first and a second position for selectively moving the hub to a second lateral position when the spreader is in the second position thereof whereby the hub is not in operative engagement with said driver sprocket and whereby the hub can rotate on said shaft about said first axis, said hub being engaged for rotary movement with said driver sprocket when said spreader in the first position thereof.

6. The bale forming machine of claim 5 wherein said reversing mechanism comprises:
a cylinder operatively attached to said spreader for selectively causing the hub and reverser driven sprocket to rotate in a direction opposite to the direction of rotation of said driver sprocket at a time when said hub is not in operative engagement with said driver sprocket whereby the rotor will be turned in a direction opposite to said first rotary direction to thereby move crop material away from said baling chamber.

7. The bale forming machine of claim 5 wherein said reversing mechanism comprises:
a drive bolt on said spreader for operatively engaging the teeth of said reverser gear when said spreader moves from a second to a third position thereof for causing the hub, reverser gear and reverser driven sprocket to rotate in a direction opposite to the direction of rotation of said driver sprocket whereby the rotor will be turned in a direction opposite to said first rotary direction to thereby move crop material away from said baling chamber.

8. The bale forming machine of claim 7 wherein said reversing mechanism also includes a hydraulic cylinder for moving said drive frame between said first and second positions thereof.

9. A method of using a bale forming machine comprising:
using a power train on the bale forming machine to operate a part of a bale forming machine which forms a bale in a bale forming chamber and to rotate a rotor during a normal operation of said bale forming machine for moving a crop into the bale forming chamber;
using an actuator to cause a clutch to detach said power train from said rotor if said bale forming machine becomes plugged with crop material without detaching the power train from that part of a bale forming machine which forms a bale in a bale forming chamber;
also using said actuator to cause a reversing mechanism to reverse the rotary direction of said rotor to a second rotary direction to cause crop material to move away from said baling chamber; and
operating said bale forming machine to complete a bale and then eject the bale from the baling chamber while said clutch is detached from the power train.

10. The method of claim 9 including using said actuator to cause said clutch to reattach the power train with the rotor, whereby normal baling operation can be resumed.

11. A method of using a bale forming machine comprising:
using a power train on the bale forming machine to operate a part of a bale forming machine which forms a bale in a bale forming chamber and to rotate a rotor during a normal operation of said bale forming machine for moving a crop into the bale forming chamber;
using an actuator to cause a clutch to detach said power train from said rotor if said bale forming machine becomes plugged with crop material without detaching the power train from that part of a bale forming machine which forms a bale in a bale forming chamber;
also using said actuator to cause a reversing mechanism to reverse the rotary direction of said rotor to a second rotary direction to cause crop material to move away from said baling chamber; and wherein said reversing is done in steps of less than 360 degrees rotation of the rotor.

12. A method of using a bale forming machine of a type for baling agricultural crops having a frame and a rotor operatively rotatably attached to said frame for moving a windrow of crop material into a baling chamber and a power train to operate a part of the bale forming machine which forms a bale in the baling chamber and to provide power to rotate said rotor in a first rotary direction to move the crop material toward the baling chamber and a clutch selectively operatively attached to the power train for selectively attaching or detaching said power train to said rotor with an actuator,
said method comprising:
using said actuator to cause said clutch to attach the power train to operate the bale forming machine to pick up a windrow of crop;
whenever said rotor becomes plugged with excess crop material, using said actuator to cause said clutch to disconnect the power train from that part of the bale forming apparatus which rotates the rotor without disconnecting the power train from that part of the bale forming machine which forms a bale in the baling chamber;
using said actuator to reverse the direction of rotation of said rotor between said first rotary direction and a second rotary direction for causing crop to move away from said baling chamber; and
using the power train to complete and eject the bale from the baling chamber after the clutch is used to disconnect the power train from that part of the bale forming apparatus which rotates the rotor in a first rotary direction but before the rotor is reversed to the second rotary position.

13. A method of using a bale forming machine of a type for baling agricultural crops having a frame and a rotor operatively rotatably attached to said frame for moving a windrow of crop material into a baling chamber and a power train to operate a part of the bale forming machine which forms a bale in the baling chamber and to provide power to rotate said rotor in a first rotary direction to move the crop material toward the baling chamber and a clutch selectively operatively attached to the power train for selectively attaching or detaching said power train to said rotor with an actuator,
said method comprising:
using said actuator to cause said clutch to attach the power train to operate the bale forming machine to pick up a windrow of crop;
whenever said rotor becomes plugged with excess crop material, using said actuator to cause said clutch to disconnect the power train from that part of the bale forming apparatus which rotates the rotor without disconnecting the power train from that part of the bale forming machine which forms a bale in the baling chamber;
using said actuator to reverse the direction of rotation of said rotor between said first rotary direction and a second rotary direction for causing crop to move away from said baling chamber; and
wherein said reversing is done in steps of less than 360 degrees turning of the rotor.

14. A method of using a bale forming machine comprising:
using a power train on the bale forming machine to rotate a rotor during a normal operation of said bale forming machine for moving a crop into a bale forming chamber;

using an actuator to cause a clutch to detach said power train from said rotor if said bale forming machine becomes plugged with crop material;

also using said actuator to cause a reversing mechanism to reverse the rotary direction of said rotor to a second rotary direction to cause crop material to move away from said baling chamber; and operating said bale forming machine to complete a bale and then eject the bale from the baling chamber while said clutch is detached from the power train.

15. The method of claim 14 including using said actuator to cause said clutch to reattach the power train with the rotor, whereby normal baling operation can be resumed.

16. The method of claim 14 wherein said reversing is done in steps of less than 360° rotation of the rotor.

17. The method of claim 14 including forming a round bale.

18. The method of claim 14 wherein a hydraulic cylinder is used to move the actuator.

* * * * *